3,083,206
2Δ,3-(5-NITRO-2-FURYL-5-(LOWER ALKYL OR PHENYL)-1,2,4-OXADIAZOLINES

Anne Mary Von Esch, North Chicago, Ill., and William Reese Sherman, University City, Mo., assignors to Abbott Laboratories, North Chicago, Ill., a corporation of Illinois
No Drawing. Filed Oct. 19, 1961, Ser. No. 146,362
7 Claims. (Cl. 260—307)

This invention relates to novel cyclic derivatives of 5-nitro-2-furylamidoxime and more particularly to compounds of the formula

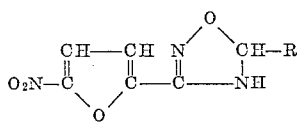

wherein R is phenyl or lower alkyl such as methyl, ethyl, propyl or butyl and methods for their preparation.

These compounds are crystalline solids only slightly soluble in water but readily soluble in a host of common organic solvents. They are active against various bacteria when properly formulated by dispersing them on a solid carrier or in a liquid carrier, such as water, at a concentration of about 50 parts per million. In a typical operation, an aqueous composition containing 50 p.p.m. of 2Δ,3-(5-nitro-2-furyl)-5-methyl-1,2,4-oxadiazoline completely inhibited the growth of *Salmonella typhimurium* and *Escherichia coli*.

The new compounds are easily prepared by heating one molecular proportion of 5-nitro-2-furylamidoxime with at least one molecular proportion of acetaldehyde, propionaldehyde, butyraldehyde, valeraldehyde or benzaldehyde at temperatures of from 50° C. to the boiling temperature of the reaction mixture. In a preferred method of operation, a large stoichiometric excess of the aldehyde, on the order of 10 to 20 fold, is employed and the reaction is carried out in a solvent boiling below 100° C. such as ethanol or benzene in order to avoid decomposition of the desired product. The reaction is generally complete in about 5 hours after which the reaction mixture is concentrated and cooled to precipitate the product which is separated and recrystallized from an organic solvent such as ethanol.

The following examples illustrate the invention but are not to be considered a limitation thereof.

EXAMPLE 1

*2Δ,3-(5-Nitro-2-Furyl)-5-Methyl-1,2,4-Oxadiazoline*

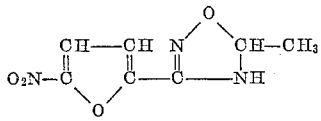

5-nitro-2-furylamidoxime (5.1 grams) and a ten fold molar excess of acetaldehyde in 100 ml. of ethanol was refluxed for 5 hours. The reaction mixture was then concentrated and upon cooling the desired oxadiazoline product precipitated which after recrystallization from ethanol melted at 157°–158° C. and contained 21.33% nitrogen which corresponded to the calculated value.

EXAMPLE 2

*2Δ,3-(5-Nitro-2-Furyl)-5-Phenyl-1,2,4-Oxadiazoline*

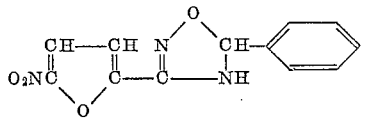

Six grams (0.035 mole) of 5-nitro-2-furylamidoxime and 50 ml. of benzaldehyde was heated at 50°–75° C. for 4 hours. The excess aldehyde was then removed under reduced pressure and the residue twice recrystallized from ethanol to obtain the desired oxadiazoline product as a pale yellow, crystalline solid melting at 155°–157° C. which upon analysis was found to contain 16.37% nitrogen as compared to the calculated value of 16.21% nitrogen.

By reacting propionaldehyde, butyraldehyde or valeraldehyde with 5-nitro-2-furylamidoxime as described in Example 1, there is obtained 2Δ,3-(5-nitro-2-furyl)-5-ethyl-1,2,4-oxadiazoline, 2Δ,3-(5-nitro-2-furyl)-5-propyl-1,2,4-oxadiazoline and 2Δ,3-(5-nitro-2-furyl)-5-butyl-1,2,4-oxadiazoline, respectively.

The 5-nitro-2-furylamidoxime employed as a starting material in this invention is a yellow solid which melts at 177°–178° C. with decomposition. It can be prepared by refluxing equimolar amounts of 5-nitro-2-furylnitrile and hydroxylamine hydrochloride in an alcohol in the presence of potassium hydroxide.

What we claim is:
1. A compound of the formula

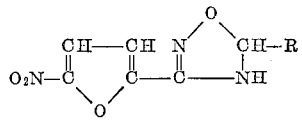

wherein R is a member of the group consisting of phenyl and lower alkyl.
2. 2Δ,3-(5-nitro-2-furyl)-5-methyl-1,2,4-oxadiazoline.
3. 2Δ,3-(5-nitro-2-furyl)-5-phenyl-1,2,4-oxadiazoline.
4. A method of preparing compounds of the formula

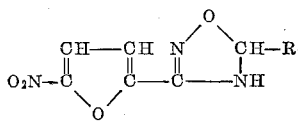

wherein R is a member of the group consisting of phenyl and lower alkyl which comprises heating at a temperature of from 50° C. to the reflux temperature of the reaction mixture one molecular proportion of 5-nitro-2-furylamidoxime with at least one molecular proportion of an aldehyde selected from the group consisting of benzaldehyde, acetaldehyde, propionaldehyde, butyraldehyde and valeraldehyde and separating the resulting product from the reaction mixture.
5. A method as claimed in claim 4 in which 10 to 20 moles of the aldehyde are employed for each mole of 5-nitro-2-furylamidoxime.
6. A method for the preparation of 2Δ,3-(5-nitro-2-furyl)-5-methyl-1,2,4-oxadiazoline which comprises refluxing an ethanol solution containing one molecular proportion of 5-nitro-2-furylamidoxime and ten molecular proportions of acetaldehyde and recovering the resulting product from the reaction mixture.
7. A method for the preparation of 2Δ,3-(5-nitro-2-furyl)-5-phenyl-1,2,4-oxadiazoline which comprises heating one molecular proportion of 5-nitro-2-furylamidoxime with from 10 to 20 molecular proportions of benzaldehyde at a temperature of from 50° C. to 75° C. and isolating the resulting product.

No references cited.